US 6,597,802 B1

(12) United States Patent
Bolle et al.

(10) Patent No.: US 6,597,802 B1
(45) Date of Patent: Jul. 22, 2003

(54) SYSTEM AND METHOD FOR GENERATING A ROLLED SURFACE REPRESENTATION FROM A SET OF PARTIAL IMAGES

(75) Inventors: Rudolf Maarten Bolle, Bedford Hills, NY (US); Jonathan Hudson Connell, Cortlandt-Manor, NY (US); Nalini Kanta Ratha, White Plains, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/382,732

(22) Filed: Aug. 25, 1999

Related U.S. Application Data

(60) Provisional application No. 60/148,811, filed on Aug. 13, 1999.

(51) Int. Cl.[7] .................................................. G06K 9/60
(52) U.S. Cl. ........................................ 382/124; 382/284
(58) Field of Search ................................. 382/124, 284, 382/125, 126, 127; 345/629; 40/5.53, 5.83; 396/15

(56) References Cited

U.S. PATENT DOCUMENTS

| | | |
|---|---|---|
| 3,200,701 A | 8/1965 | White |
| 3,482,498 A * | 12/1969 | Becker .......................... 355/40 |
| 4,933,976 A | 6/1990 | Fishbine et al. |
| 4,946,276 A | 8/1990 | Chilcott |
| 5,187,754 A * | 2/1993 | Currin et al. ................. 382/263 |
| 5,230,025 A * | 7/1993 | Fishbine et al. ................ 356/71 |
| 5,233,404 A * | 8/1993 | Lougheed et al. ...... 250/227.19 |
| 5,467,403 A | 11/1995 | Fishbine et al. |
| 5,625,448 A | 4/1997 | Ranalli et al. |
| 5,748,766 A * | 5/1998 | Maase et al. .................. 356/71 |
| 5,852,670 A | 12/1998 | Setlak et al. |
| 6,177,034 B1 * | 1/2001 | Ferrone ....................... 264/102 |

OTHER PUBLICATIONS

Burt et al. "A Multiresolution Spline with Application to Image Mosaics." ACM Transactions on Graphics, vol. 2, No. 4, Oct. 1983, pp. 217–236.*
Ratha et al. "Image Mosaicing for Rolled Fingerprint Construction." Proc. of the Fourtheenth Int. Conf. on Pattern Recognition, vol. 2, Aug. 16, 1998, pp. 1651–1653.*

(List continued on next page.)

Primary Examiner—Jon Chang
(74) Attorney, Agent, or Firm—Louis J. Percello; Charles W. Peterson, Jr.

(57) ABSTRACT

The invention is a system and method for constructing a rolled surface image from a set of partial surface images. A sequence of individual partial surface images is acquired as an object is progressively rolled across the surface of an imaging device. The imaging device is configured so that only that part of the object's surface which is in close proximity is imaged. To produce a complete rolled surface image, i.e. a composite image, the value of each pixel of the composite image is derived by performing a suitable pixel operation on the set of corresponding pixels in the input partial surface images. This is possible because each partial image is represented as a fixed size and each pixel in each of the partial images has a unique position in the partial image. The system can also directly produce a list of salient surface features. Localized features are extracted from each individual partial image whereas other specific attributes of each image are ignored. The features from different partial surface images are then matched up to generate clusters of observations associated with each unique surface feature. These clusters are analyzed to produce more accurate positional information as well as a confidence measure for each observed feature in the complete set covering the rolled surface of the object.

19 Claims, 9 Drawing Sheets

OTHER PUBLICATIONS

Anil K. Jain, et al., Fourteenth International Conference on Pattern Recognition, IEEE, Computer Society, Los Alamitos, California, Aug. 16–20, 1998, pp. 1651–1653.

Nalini K, Ratha, et al., Adaptive Flow Orientation–Based Feature Extraction in Fingerprint Images, Pattern Recognition, vol. 28, No. 11, 1995, pp. 1657–1672.

* cited by examiner

SYSTEM AND METHOD FOR GENERATING A ROLLED SURFACE REPRESENTATION FROM A SET OF PARTIAL IMAGES

This patent application claims the benefit of U.S. Provisional Patent Application Ser. No. 60/148,811, filed Aug. 13, 1999.

FIELD OF THE INVENTION

This invention relates to the field of image processing. More specifically, the invention relates to the generation of a rolled surface image representation from a sequence of partial surface images.

BACKGROUND OF THE INVENTION

In an image processing system, the first step is to image the object of interest. Often a single view of the object is not sufficient for recognition purposes. Instead, a suitably distributed image sequence comprising of different views of the object can be used to represent all the views of the object. In order to combine this sequence into a single image, special mosaicking techniques are used.

One application in which such mosaicking would be desirable is fingerprint imaging. Fingerprints have been used for automatic authentication and identification purposes for several decades. The following journal article describes examples of the state of the prior art. This reference is incorporated herein by reference in its entirety.

N. K. Ratha, S. Chen and A. K Jain, Adaptive flow orientation based feature extraction in fingerprint images, Pattern Recognition, vol. 28, no. 11, pp. 1657–1672, Nov. 1995.

As shown in FIG. 1, a typical automatic fingerprint identification systems consists of the above mentioned image acquisition stage (110) followed by feature extraction (120) and feature matching (130). The system can be either entirely local, with the fingerprint being processed on the client, or distributed, with the image or feature list sent over a network to some remote server. In either implementation, the first step (110) is to acquire a fingerprint image such as shown in FIG. 2 (item 250). There are several techniques available for sensing the fingerprint image. These include optical, capacitance, thermal and ultrasound. A typical inkless fingerprint scanner uses a prism and total frustrated internal reflection techniques to image the finger touching the prism surface. (For example see U.S. Pat. No. 3,200,701 to W. White and U.S. Pat. No. 5,467,403 to Fishbine et al.) A newer generation of inkless scanners use electrostatic or capacitive coupling techniques to sense the ridges and valleys of the finger (cf. U.S. Pat. No. 5,852,670 to Setlak et al.).

The step (120) in a fingerprint analysis system is to extract tightly localized minutia features. FIG. 2 shows such features, like the ending 203 of ridge 205 or the bifurcation 201 of a ridge. These features can be represented by a list 210 which indicates the type of each minutia and its location coordinates within the image. Other information such as the local ridge orientation or a detection confidence measure could also be added to each list element. These features are then used in final step (130) for matching the extracted target minutiae set to some stored reference minutiae set.

During image acquisition (110) in a fingerprint analysis system, the images acquired are typically of one of two types. There are "rolled" fingerprint images, which are images of a finger from nail-to-nail and "dab" or plain fingerprint images, which are images of a finger as it touches the fingerprint image acquisition surface. The fingerprint dabs are good enough for verification or identification purposes. However, the rolled fingerprints have more information for matching to images of any part of the finger, and hence are preferred for the enrollment process—registering a person's identity and storing an associated unique fingerprint template.

In the traditional method of acquiring a fingerprint using ink and paper, the rolled impressions are available effortlessly through the simple process of just rolling the finger. When using an ink-less scanner for acquiring digital images directly, obtaining a rolled digital fingerprint image is not as straightforward. These scanners are set up to quickly snap single images, and do not accumulate pressure-based markings across their surface as with the inked finger rolling on paper. Digital image scanners are preferable in most applications because they are faster and less messy. Yet rolled prints contain the greatest amount of information.

Thus a method that allowed a live scan fingerprint reader to generate the equivalent of rolled impressions would be desirable. An ink-less scanner with a fast enough image acquisition system can grab multiple partial surface images while a subject rolls a finger over the surface of the scanner. Each partial surface image just shows that portion of the finger's surface which is currently in contact with the scanner. Appropriate mosaicking software would allow the integration of such a multitude of partial surface images into a single, more detailed composite image of the finger surface.

PROBLEMS WITH THE PRIOR ART

The construction of a rolled impression from a sequence of partial fingerprint images can be viewed as an image mosaicking technique. That is, it consists of registering and combining a sequence of images with a small field of view to generate an image having a larger field of view and possibly higher resolution. Most of the prior art in this area of image mosaicking is quite compute intensive. A review of the techniques in this area is available in the paper cited below. This reference is incorporated herein by reference in its entirety.

N. K Ratha, J. H. Connell and R. M. Bolle, Image Mosacing for Rolled Fingerprint Construction International Conf. On Pattern Recognition, Brisbane, Australia, 1998, pp. 1651–1653.

The following references give further background on the reconstruction specifically of rolled fingerprints using software or hardware techniques and are also incorporated by reference in their entirety:

B. H. Fishbine, G. M. Fishbine, T. D. Klein and D. E. Germann, System for Generating Rolled Fingerprint Images U.S. Pat. No. 4,933,976, June 1990.

W. J. Chilcott, Full Roll Fingerprint Apparatus U.S. Pat. No. 4,946,276, August 1990.

E. Ranalli and B. G. Broome, Fingerprint Imaging U.S. Pat. No. 5,625,448, April, 1997

Fishbine's system uses multiple dab impressions to reconstruct a large area gray-scale fingerprint image equivalent to a rolled ink image. However, it requires the processor to compute pixel variances to determine the "active area" of each successive image (that is, the portion containing the fingerprint). Only pixels from these regions in each image are used to create the composite result. Moreover, this system only really merges pixel values in a slim transition region at the trailing edge of the active area of each new impression Locating this region requires additional computation to determine the nearest sufficiently dark area within the previously defined active area. The total amount of computation required in this approach makes it undesirable for some applications. Also, the quality of the result can be adversely affected if the determination of the impression's active area or trailing edge is inaccurate.

Chilcott's system uses a linear sensor and scanning optics to build up an image one line at a time. A series of lights is turned on and off to demarcate the line along which the optical scan is currently being taken. To develop a fill rolled print the subject rolls his finger on the glass platen at the same rate as the optical scan as indicated by the lights. Alternately, a motor can rotate the finger or the camera.

Ranalli's system is similar except it uses a flat glass scanning surface instead of a curved one. While rolled image construction is not described explicitly in either patent, the situation here is fairly straightforward since each scan line is distinct. There is no need to merge information from different scans since the linear images they produce never overlap. Instead, the individual scans can just be concatenated to form the final image.

One disadvantage of these systems is that the subject must carefully roll his finger at a certain rate or else the current scan line will miss his finger. A second disadvantage is that each portion of the finger is only imaged once. This precludes using multiple observations as a basis for generating a confidence measure for extracted features, and is eliminates the possibility of producing a more accurate image of the finger by carefully merging overlapped regions.

OBJECTS OF THE INVENTION

An object of this invention is an improved system and method for constructing a rolled surface image from a sequence or set of partial surface images.

An object of this invention is an improved system and method for constructing a rolled surface image from a sequence or set of partial surface images, independent of roll rates.

An object of this invention is an improved system and method for computing a more complete surface feature set from a sequence or set of partial surface images.

A further object of this invention is an improved system for computing a confidence measure for each feature in a feature set derived from a sequence or set of partial surface images.

SUMMARY OF THE INVENTION

The invention is a system and method for constructing a rolled surface representation from a sequence of partial surface images. While the invention describes specific issues concerned with fingerprints as the objects to be imaged, it also applies to other objects with physically textured convex surfaces.

In a present preferred embodiment, the rolled fingerprint image is constructed from a sequence of partial images (dab impressions). Bach dab impression is a partial image of the finger (object) surface. A sequence of individual dab images is acquired as the finger is progressively rolled across the sensing surface. The quality of the partial images is independent of roll rate because only parts of the object that are within a image depth from the imaging device are taken in each of the partial images. In a preferred embodiment, this image depth is determined by taking an image of the object only at the point the surface normal of the object is parallel to an imaging axis, within a tolerance.

To produce a rolled fingerprint output image, i.e., a composite image, the value of each pixel of the composite image is derived by performing a suitable pixel operation (combination) on the series of counterpart (corresponding) pixels in the input dab images This is possible because each partial image is represented as a fixed size and each pixel in each of the partial images has a unique position in the partial image, called the image position.

In an alternative embodiment, to produce a complete minutiae set, minutiae features are extracted from each individual dab image and then matched across dab images to generate clusters of observations associated with each output minutiae. These clusters are then analyzed to produce more accurate positional information as well as a confidence measure for each observed minutiae feature in the complete set covering the rolled surface of the finger.

DETAILED DESCRIPTION OF THE INVENTION

Figure 3:
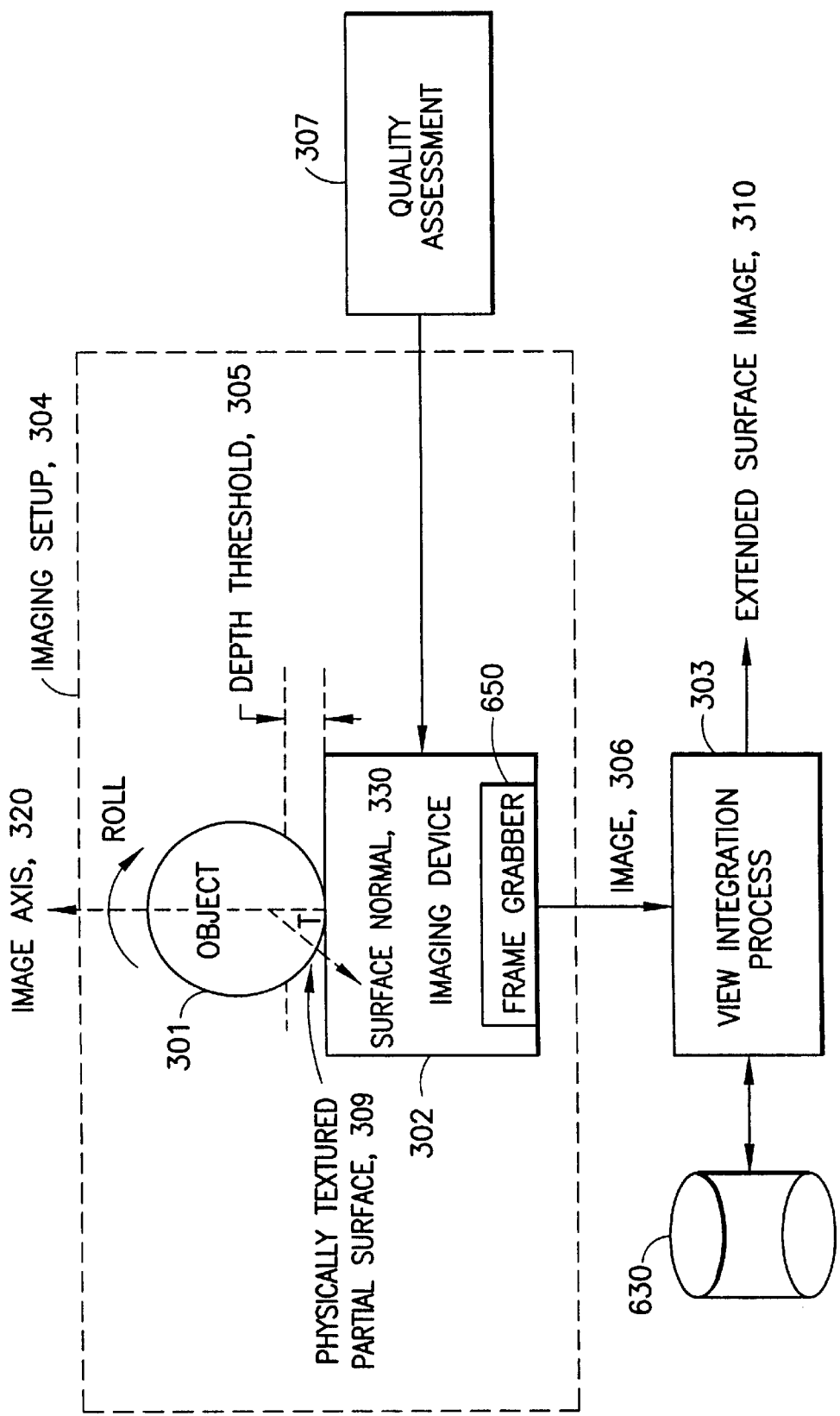
FIG. 3 is a block diagram of a preferred embodiment of the present invention for generating composite images.

FIG. 3 is a block diagram example of a preferred embodiment of the invention. Object 301 comprises convex surfaces each of which may have some physical texture. The object 301 is rolled over the imaging device 302 of the imaging setup 304. At each point along the roll path, a partial surface image 306 is produced. This contains within it a region corresponding to the portion 309 of the surface which is adjacent to imager 302 within a tolerance as specified by depth threshold 305. Imaging device 302 can be an FTIR (frustrated total internal reflectance) fingerprint scanner, optical camera, thermal fingerprint sensor, capacitive sensor, ultrasonic sensor, or other imaging device known to one skilled in the art. Typical objects suitable for imaging include but are not limited to: human fingers, cylindrical containers such as beverage cans or bottles, toroidal objects such as automobile tires, and disk-like objects such as medicinal tablets or coins.

The imaging setup 304 is carefully designed so that portion of the surface above depth threshold 305 does not contribute to the partial surface image 306. Depth restriction 305 maybe imposed by the penetration depth of evanescent waves in an optical or acoustic frustrated total internal reflectance sensor, by the plate geometry in a capacitive sensor, by the diffusion time constant in a thermal system, by a limited depth of field in a microscope system, or by carefully arranged sheet illumination provided by lamps in a purely optical system. Because the surface of object 301 is convex, in many cases an equivalent constraint can be imposed by requiring that the deviation of the surface normal 330 be within tolerance T of imaging axis 320.

Figure 4:
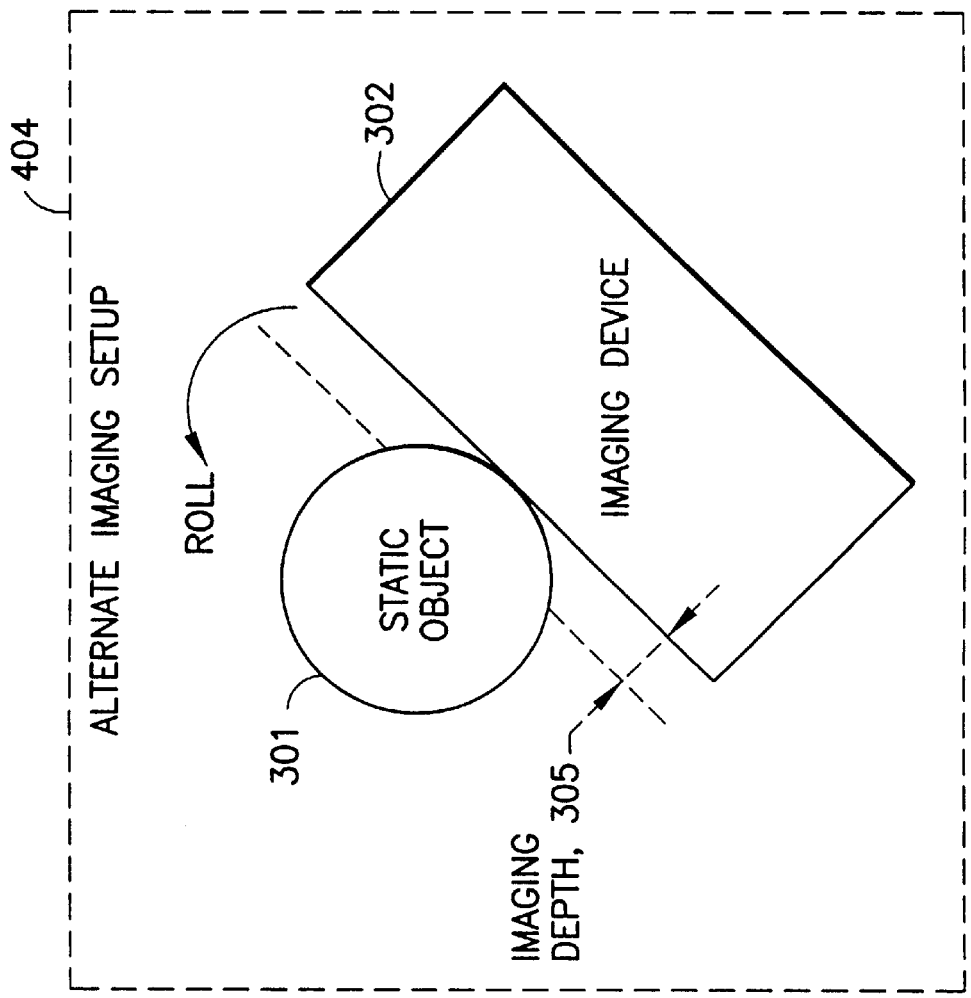
FIG. 4 is a block diagram of an alternative implementation of the rolled imaging setup.

The resulting images 306 are captured via framegrabber 650 at a regular interval, or as commanded by an external quality assessment process 307 which embodies a stopping condition. The partial surface images 306 are then fed to the view integration process 303. The view integration process can either store them in some format 635 in a local disk 630 or process each partial surface image 306 as soon as it arrives. The extended surface image 310 is produced after combining the entire image sequence. As shown in FIG. 4, in an alternative imaging setup 404 the object 301 can be static and the imaging device 302 can be rolled around it instead.

Figure 5:
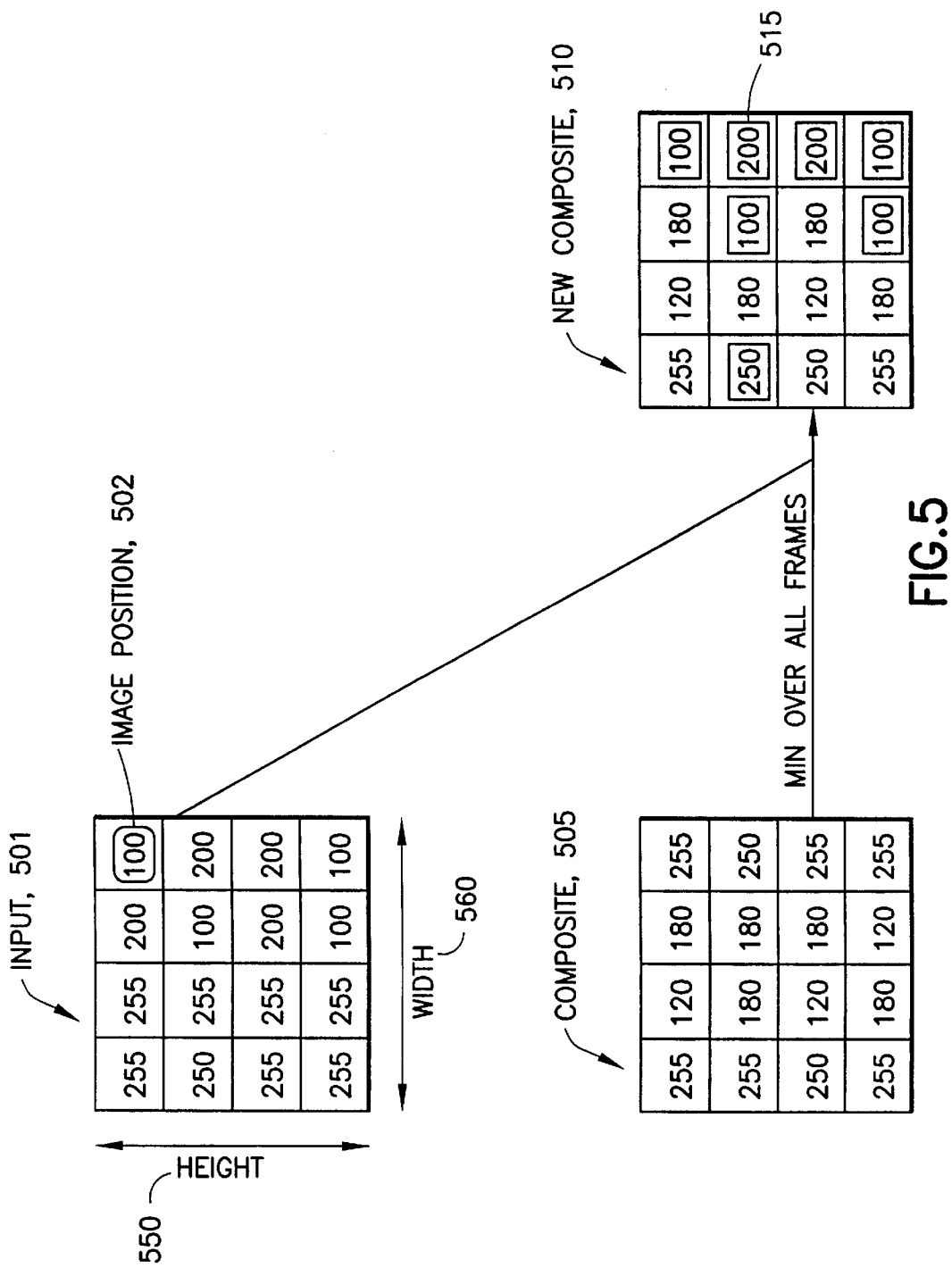
FIG. 5 is a diagram of a preferred method for integrating images with overlapping views.

As shown in FIG. 5, the frames, or partial images, acquired 306 are assumed to be of constant or fixed size. In a preferred embodiment, the frames, or partial images, are rectangular in shape and have a width 560 and height 550. In this example both width and height are 4 pixels. Each pixel has a fixed image position, typically 502. Pixels values are typically 8-bit integer values representing light intensity although color or other sorts of values and resolutions could be used. Here darker areas of in the partial surface image 306 would correspond to lower pixel values (many fingerprint images have a light colored background with the ridges appearing darker). The two frames shown are the input frame 501 (one of the partial surface images 306) and the combined frame 505. The latter is the partially merged image 505 up to the point that the input frame 501 is acquired.

The two images are already in perfect registration since they were obtained by the same image acquisition device 302. The task now is to merge input frame 501 with the combined frame 505 to produce the new combined frame 510. One way to achieve this is by computing the pixel-wise minimum of the partially mosaicked frame 505 and the current input frame 501, which is equivalent to replacing each pixel in the new partially mosaicked image 510 by the minimum of the corresponding pixels in the input image 501 and the current mosaicked image 505. Pixels are considered corresponding if they have the same image position 502. For illustration purposes, the pixels that are affected by this merger, such as 515, are shown enclosed by a secondary box in the new composite image 510. Alternatively, if higher pixel values correspond to fingerprint ridges and lower values correspond to valleys, then the "maximum" operation on the corresponding pixels in input image 501 and combined image 505 is performed instead.

In an alternative preferred embodiment, each of the partial surface images is saved. Then, a value for each output pixel at a specific image position is computed by examining the values of all of the corresponding (i.e., those with the same image position) input pixels simultaneously. One method to accomplish this is to histogram the various pixel values observed at a particular image position. Typically, some observations will be of the background, some of the fingerprint ridges, and some of the fingerprint valleys. While each type of observation has a characteristic value, there is likely to be some spread around this mean due to imaging noise. Therefore, one can approximate the histogram by decomposing it into the sum of three Gaussian distributions, one for each class of observation. In many imaging setups the ridges will have the darkest (or brightest) gray scale value. Therefore, one can take the mean of the lowest (or highest) Gaussian and use this as the value for the output pixel at that image location.

Figure 6:
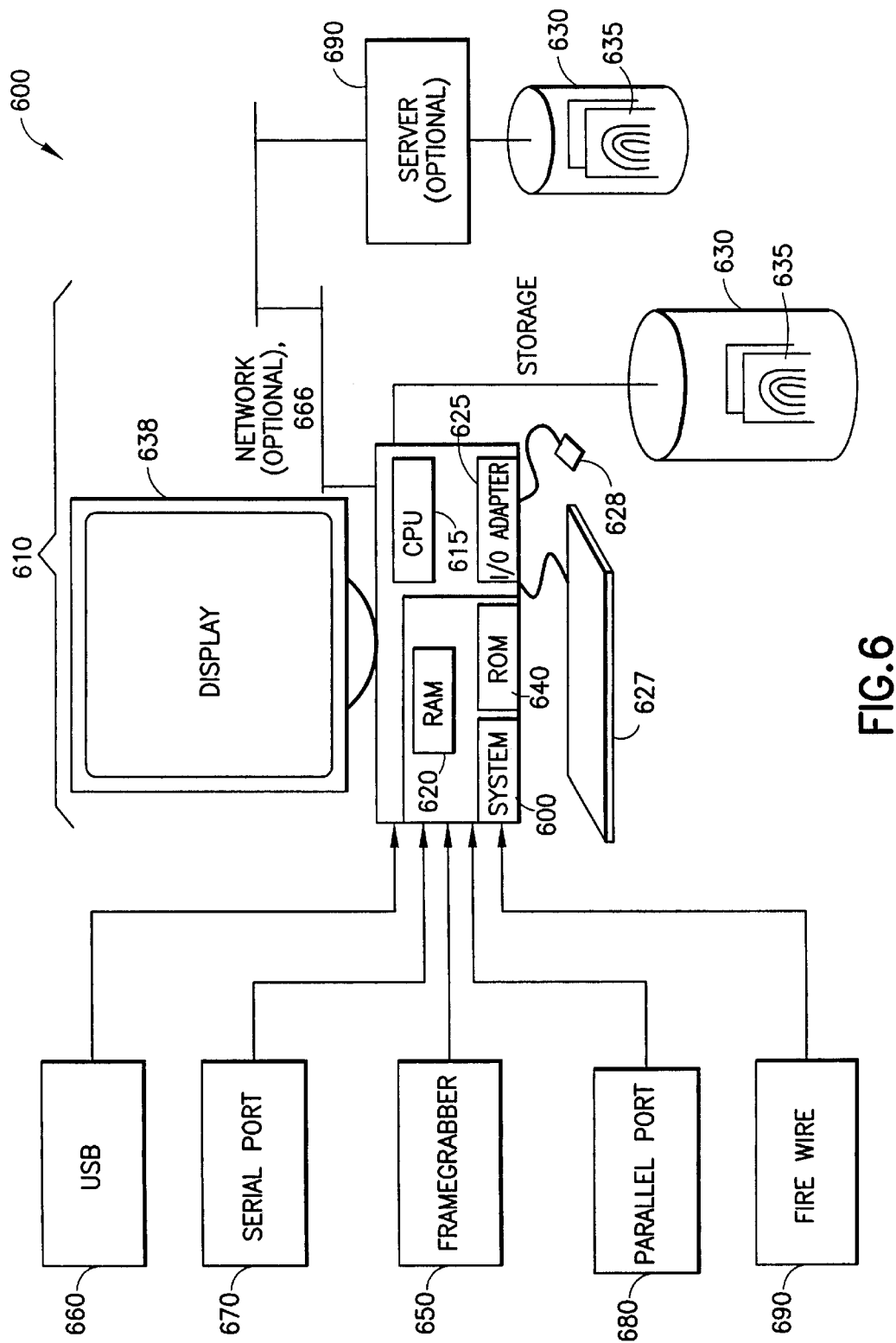
FIG. 6 is a block diagram of one preferred embodiment of the view integration processor.

FIG. 6 is a block diagram of a system for running the view integration process 303. This diagram shows a general computer hardware environment that is used for processing. An example of the computer 610 maybe one of: International Business Machines Corporation IBM) PowerPC family of Personal Computers, a RISC System/6000, or Power Parallel System (SP/x), or equivalent. The system 600 includes one or more central processing units (CPU) 615, which may conform to any general computer architecture (e.g., Intel Pentium or a reduced instruction set Microprocessor.) The CPU 615 is attached to a system bus (not shown) to which are attached a read/write and/or random access memory (RAM) 620 that can include one or more cache memories (not shown), a read only memory (ROM) 640, and an input/output adapter 625.

The RAM 620 typically provides temporary storage for one or more application program processes containing code and/or data while the ROM 640 typically includes the basic input/output system (BIOS) code. Direct Access Storage Devices (DASDs), here represented by hard disk drive 630, are also connected to the CPU by an appropriate adapter (not shown.) The hard disk drive 630 typically stores the computer's operating system (OS), such as IBM's OS/2 operating system, and various application programs, data, and/or databases. These databases include intermediate results and fingerprint image data 635. Optionally these storage units 630 can be remote and connected through an optional network 666 using well known technologies. In this network embodiment, the remote server 690 is a computer similar to 610. The remote server communicates with the local host/client using LAN, WAN, telephone, radio link, or other standard telecommunication networks 666 that are well known. Typically, the input/output adapter 625 has attached to it a keyboard 627, a mouse 628, and/or other user interface devices (not shown). The system 600 also can include a display 638, here represented as a cathode ray tube (CRT) display, but which may be a liquid crystal display (LCD) or other suitable display and/or graphic user interface (GUI) 638. The display 638 is connected to the system bus via a display adapter (not shown). The computer 610 interacts with the imaging setup 304 with a framegrabber 650 or through other interfaces such as parallel port (680), serial port (670), USB port (660), or IEEE 1394"fire wire" port (690).

PowerPC, OS/2, RISC System/6000, Power Parallel System, SP/x, and IBM are trademarks of the International Business Machines Corporation. Intel Pentium is a trademark of the Intel Corporation.

Figure 7:
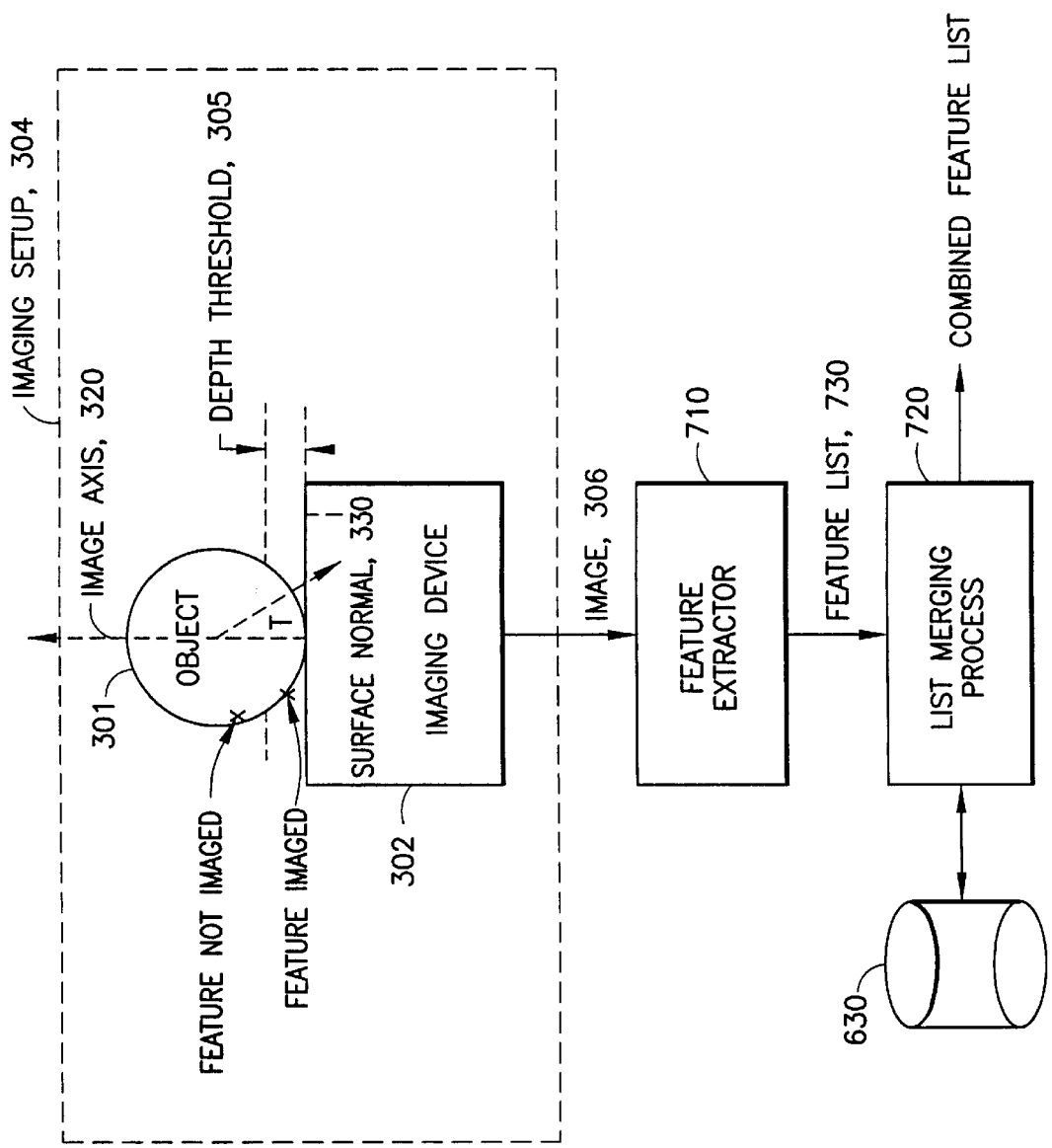
FIG. 7 is a block diagram of a preferred embodiment of the present invention for generating combined feature lists.

FIG. 7 shows the interaction of the imaging subsystem with the feature combiner subsystem. Each frame/image 306 is fed to a feature extractor 710 to extract the features of interest. For example, a fingerprint feature extractor locates the minutiae features of the type shown in FIG. 2. A typical prior art for fingerprint minutia extraction is described in the Pattern Recognition paper by Ratha, Chen and Jain cited above. This paper teaches the extraction of minutiae from a gray scale fingerprint image based on the following steps. The first step in the process is to compute the flow direction at every pixel in the image. In the second step the image is broken into multiple blocks of pixels and for each block an optimal estimate of the flow direction is computed. Next, the ridges are segmented by examining the gray scale profile orthogonal to the flow direction. In the next step, the binary ridges are thinned and morphologically smoothed followed by locating the minutiae feature on the thinned image. A final post-processing stage filters out spurious minutiae based on heuristic criteria.

Figure 1:
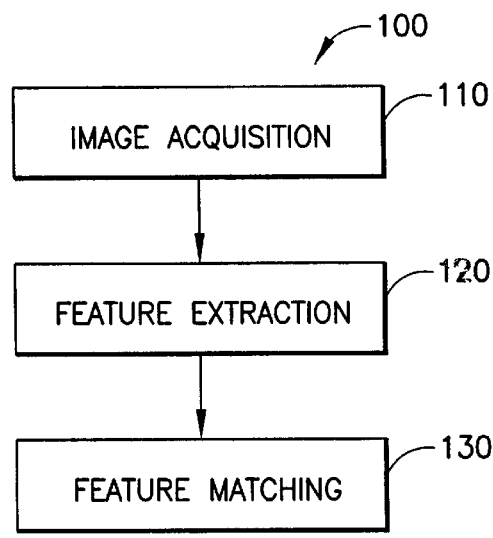
FIG. 1 is a block diagram of a prior art automatic fingerprint identification system.
Figure 2:
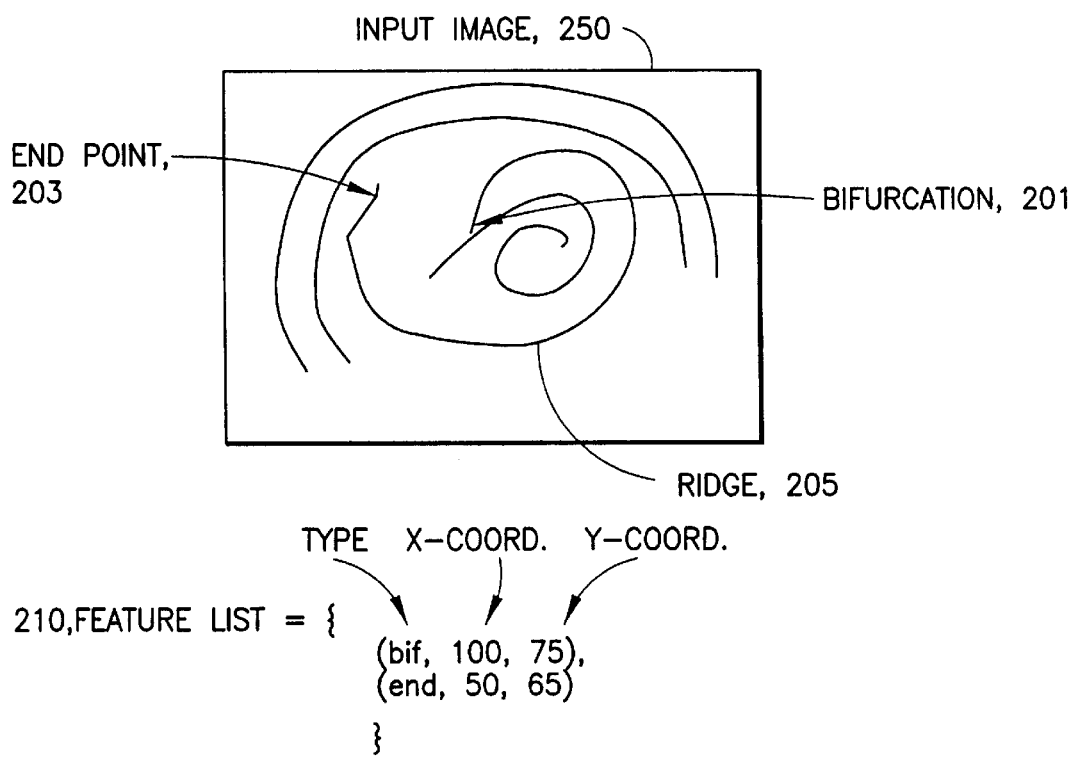
FIG. 2 shows a prior art fingerprint image composed of ridges with minutiae features (ridge endings and ridge bifurcations).
Figure 8:
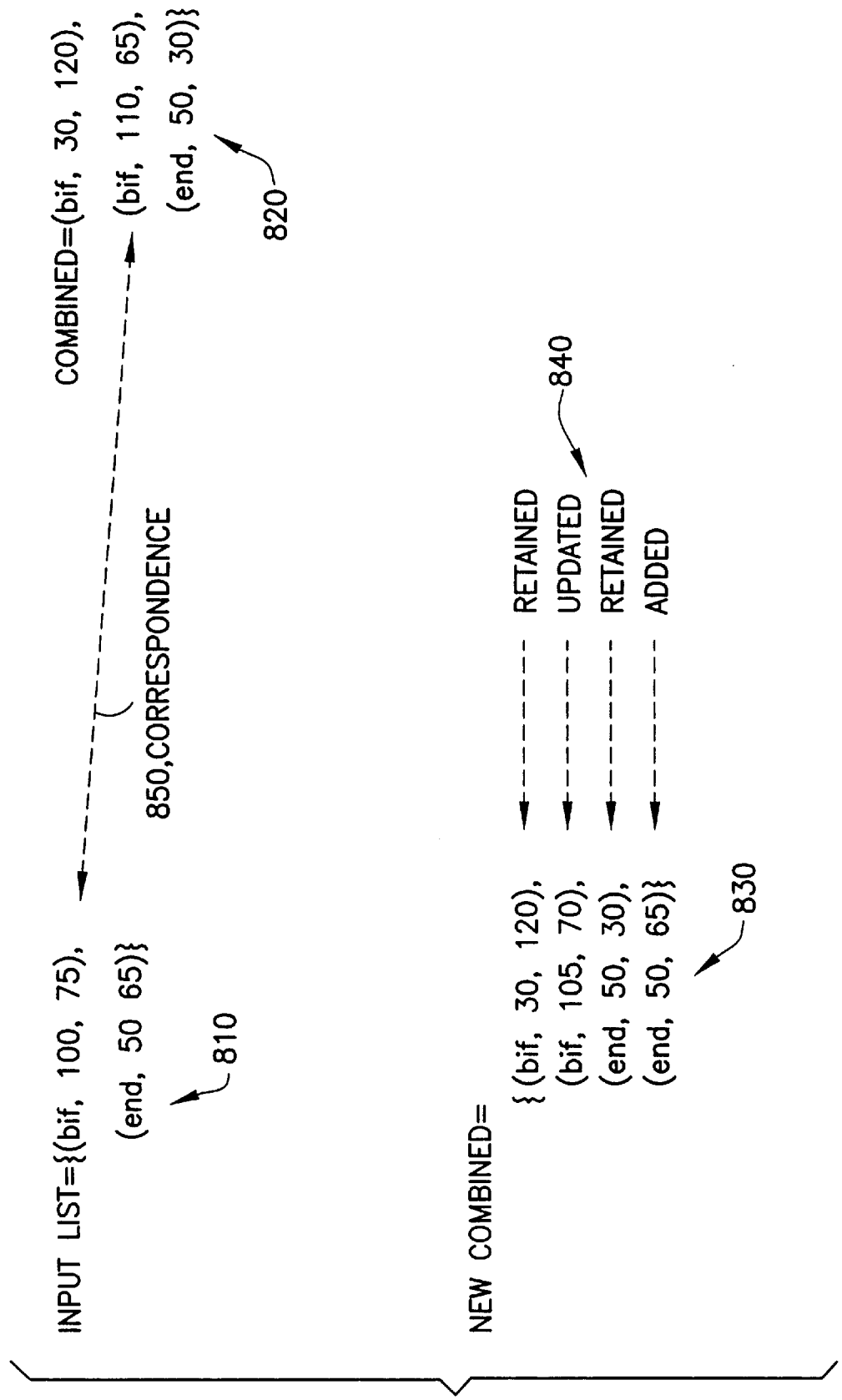
FIG. 8 is a diagram of a preferred method for feature list merging.

The output of the feature extractor is a set of features, in a preferred an input list of features 730. An example of a feature list for a set of fingerprint minutiae is shown in FIG. 2 (210). The list merging processor 720 works on either a set of feature lists or an input feature list and a partial combined list as shown in FIG. 8. If there is a correspondence 950 between a feature between the input list 810 and the combined list 820, the new combined list reflects this by updating 840 the corresponding feature location. In the example shown in FIG. 8, the input list 810 and combined list 820 are merged to form the new combined list 830. The corresponding feature pair is shown as updated 840 in combined list 830. Feature correspondence can be based on the distance between the features using a suitable metric. A confidence measure (not shown) can optionally be associated with each feature in the combined list. This confidence measure can be based on the number times a feature has been observed in the input images (based on correspondences). Alternate confidence measures are functions inversely proportional standard deviation of distances from the mean for features determined to correspond, or the fraction of frames in which a feature appeared with respect to the number of frames in which it should have appeared. For this measure, a feature from the combined feature list should appear either when a valid correspondence is found between it and some other feature in the new input feature list, or when its presumed position falls within the convex hull of features in the new input feature list.

Figure 9:
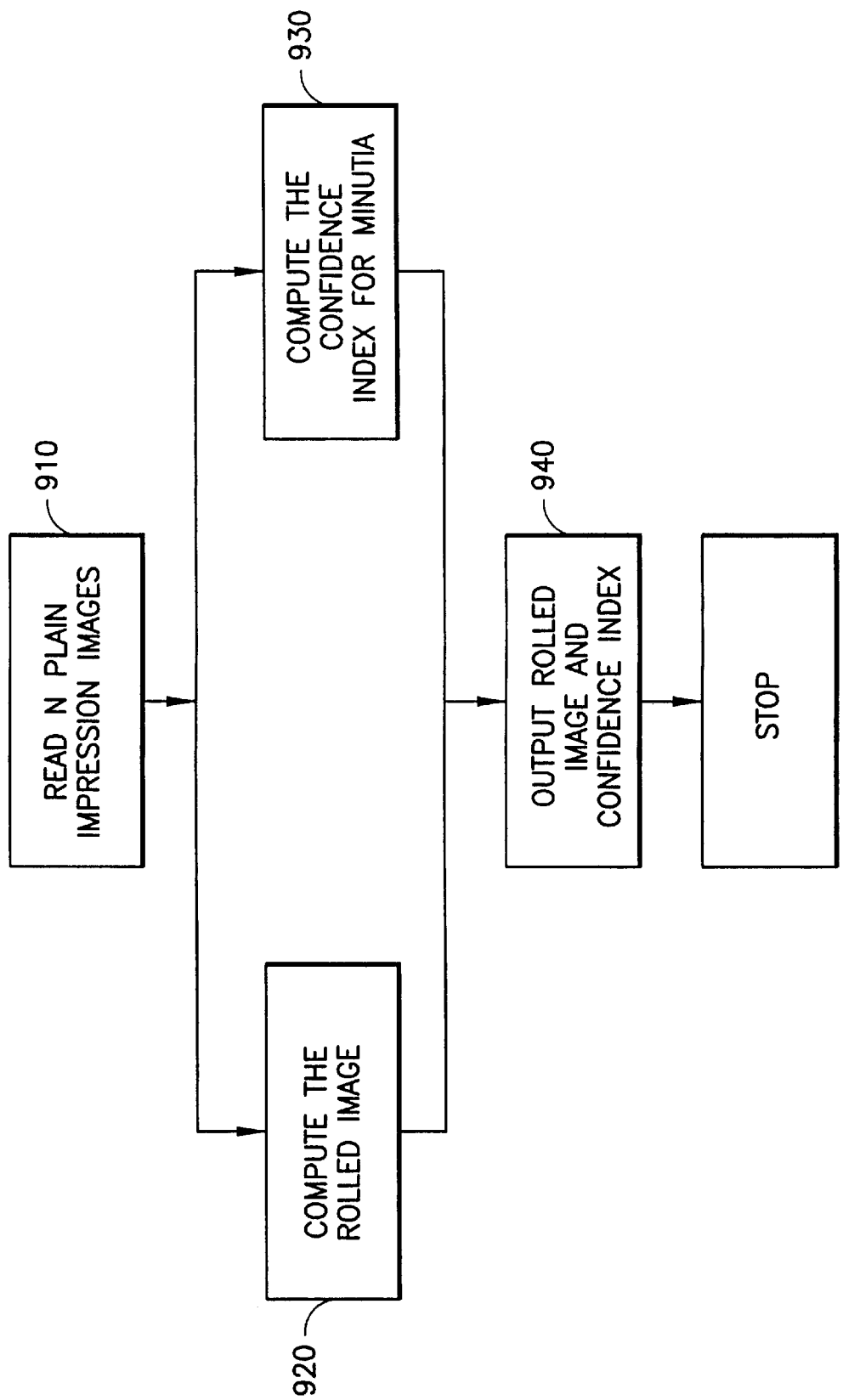
FIG. 9 is a flow chart of the overall system process.

FIG. 9 is the flow chart of the overall system that produces the rolled surface representation and/or feature lists with confidence measures. In step 910 the image frames are acquired. In the incremental mode, a frame is processed and the steps are repeated until all the frames are handled. In the batch mode, all the image frames are assumed to be available at the same time. In step 920, the rolled surface representation is computed as per FIG. 3. In step 930, the surface features are extracted and confidence measures are computed as per the description in FIG. 7. In step 940, the system outputs one or both of the results.

Figure 10:
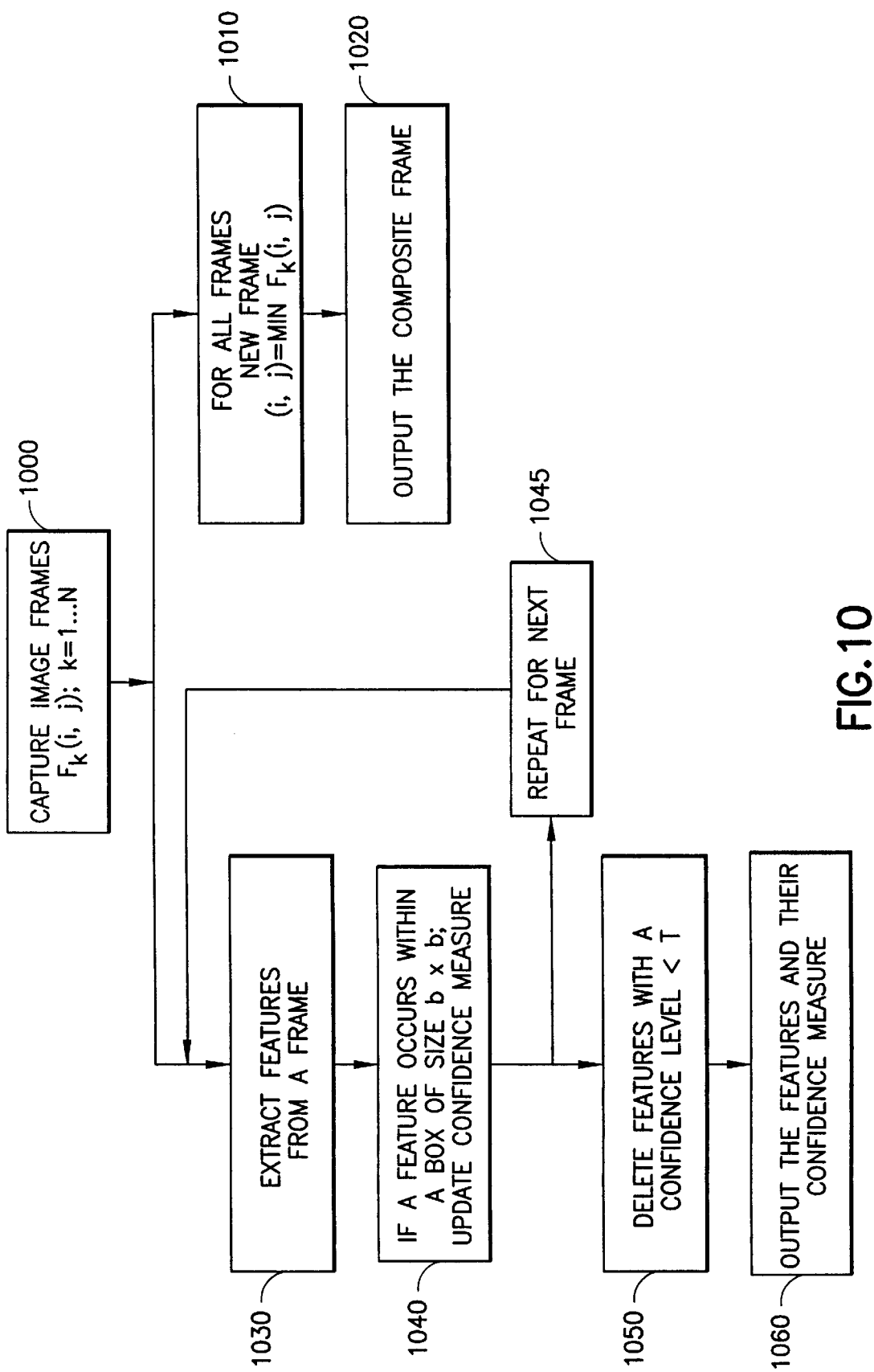
FIG. 10 is a flow chart of the rolled fingerprint construction process and confidence computation process.

A preferred embodiment of the invention for rolled fingerprint image construction is shown in FIG. 10. In step 1000, N (a preferred value is 10) frames of the subject's finger are acquired using an inkless fingerprint scanner. In step 1010, the resultant rolled image is computed by computing the min function at every pixel. The resultant frame is outputted in 1020. In step 1030, which can run parallel to the rolled frame construction process, the minutia features are extracted automatically and the list of features constructed. If a feature occurs within a 10×10 block from its location in the previous frame (a preferred implementation of the correspondence step 850), the confidence measure is updated appropriately for the feature 1040. In a preferred implementation the confidence measure is just a count of the number of times the feature has been observed and updating consists of incrementing this counter. This process is repeated for all the frames in step 1045. After all the frames are processed, in step 1050, the combined feature list is examined and any feature with a confidence measure less than T (a preferred value is 2) is dropped from the list. The new list of features is outputted in step 1060.

The complete system as described has several compelling advantages. First, the system is able to generate the desired high information content rolled prints using any variety of the much quicker (and less messy) live fingerprint scanners. Second, for composite image reconstruction the computational load is quite light—the system just performs simple pixel-wise operations across the whole image. Furthermore, no attempt is made to localize the portion of the image containing the fingerprint resulting in a further saving of computation. Third, the system is able to use multiple fingerprint impressions to not only generate a larger set of minutiae than would be possible with a single dab, but also to yield a higher quality feature set where the position and confidence of each minutiae can be refined by comparing its appearance across the sequence.

The invention can also be used with just particular features extracted from each partial surface image, as opposed to the full graphical images themselves. Features found in the individual images of the sequence are progressively combined to provide a more comprehensive list of features spanning the entire rolled surface. Since the partial surface images usually overlap, any particular feature will typically be found in several images. Based on these multiple observations, a confidence measure can be established for each feature. Again, using the field of fingerprint analysis as an example, the system would extract and match the fingerprint minutiae from one partial impression to the next. In this way it can simultaneously provide the full set of minutiae features for the equivalent rolled fingerprint and also, as a further aid to matching, supply a reliability measure associated with each minutiae.

The imaging setup and rolling procedure described make the job of mosaicking the partial surface images together particularly easy. The depth threshold ensures that there will be minimal distortion in each of the partial surface images so no other correction is required. The process of rolling the object without slippage guarantees that each partial surface image will be registered correctly in relation to all the others so no other fitting procedure is necessary. Finally, because the imaging setup is very selective about which portion of the surface it records, there is no need to determine valid regions after the fact nor compute overlaps between these regions to guide the merging process. This reduces the mosaicking problem to essentially laying all partial surface images atop of one another and combining them on a simple pixel-by-pixel basis.

We claim:

1. A system for generating an extended surface image of an object having one or more convex surfaces, each of the convex surfaces having a characteristic radius and one or more physical textures, the system comprising:

an imaging device that acquires a plurality of partial surface images of the object, each of the partial surface images having a fixed size and including a fixed number of pixels, each partial surface image being of the part of the object adjacent, within a tolerance, to the surface of the imaging device, each partial surface image having an image position for each pixel, and the object being continuously rolled with respect to the imaging device so that each part of the partial surface of the object is associated with a respective image pixel position; and a view integration system combining each pixel at the respective image pixel position, such that all of the partial surface images merge.

2. A system, as in claim 1, where the object being imaged is a human finger.

3. A system, as in claim 1, where the object being imaged is a rigid cylindrical container.

4. A system, as in claim 1, where the imaging device is an optical camera.

5. A system, as in claim 1, where the imaging device is an ultrasound sensor.

6. A system, as in claim 1, where the imaging device is an electronic capacitive sensor.

7. A system, as in claim 1, where the imaging device is a thermal sensor.

8. A system, as in claim 1, where the tolerance is determined by a frustrated total internal reflection-based live scan fingerprint sensor.

9. A system, as in claim 1, where the tolerance is less than 10% of the characteristic radius of each of the object's convex surfaces.

10. A system, as in claim 1, where the pixel combining is done by taking the smallest pixel value of all pixel values at the respective image position.

11. A system, as in claim 1, where the pixel combining is done by taking the largest pixel value of all pixel values at the respective image position.

12. A system, as in claim 1, where the view integration process determines a histogram of the pixel values at each image position and uses this to derive an output value.

13. A system, as in claim 12, where the view integration process approximates the pixel value histogram by a sum of several Gaussian distributions and the mean value of one of the resulting Gaussian distribution is outputted.

14. A system, as in claim 1, where each partial surface images are not stored but are merged as soon as the partial surface image is available.

15. A system, as in claim 1, where the partial surface images are acquired until a stop condition is met.

16. A system, as in claim 15, where the stop condition is one or more of the following: a number of frames processed, time taken for acquiring said partial surface images and a signal generated by a human observer.

17. A system, as in claim 1, wherein continuously rolling the object with respect to the imaging device is effected by holding the object stationary and rolling the imaging device around the object to acquire the partial surface images.

18. A system for generating an extended surface image of an object having one or more convex surfaces, each of the convex surfaces having a characteristic radius and one or more physical textures, the system comprising:

an imaging device that acquires a plurality of partial surface images of the object, each of the partial surface images having a fixed size and including a fixed number of pixels, each partial surface image being of the part of the object adjacent, within a tolerance, to the surface of the imaging device, each partial surface image having an image position for each pixel, and the object being continuously rolled with respect to the imaging device so that each part of the partial surface of the object is associated with a respective image pixel position, wherein said tolerance is determined by an illumination source producing a limited thickness sheet of light substantially parallel to the surface of the imaging device; and a view integration system combining each pixel at the respective image pixel position, such that all of the partial surface images merge.

19. A system for generating an extended surface image of an object having one or more convex surfaces, each of the convex surfaces having a characteristic radius and one or more physical textures, the system comprising:

an imaging device that acquires a plurality of partial surface images of the object until reaching a stop condition, each of the partial surface images having a fixed size and including a fixed number of pixels, each partial surface image being of the part of the object adjacent, within a tolerance, to the surface of the imaging device, each partial surface image having an image position for each pixel, and the object being continuously rolled with respect to the imaging device so that each part of the partial surface of the object is associated with a respective image pixel position, said stop condition being based on one or more of the following characteristics of the extended surface image: a pixel average gray value, a bounding box of pixels below an intensity threshold, and mathematical moments of pixel values; and a view integration system combining each pixel at the respective image pixel position, such that all of the partial surface images merge.

* * * * *